(12) United States Patent
Yamine et al.

(10) Patent No.: US 12,425,880 B2
(45) Date of Patent: Sep. 23, 2025

(54) RADIO NETWORK NODE AND METHOD PERFORMED THEREIN FOR COMMUNICATION IN A WIRELESS COMMUNICATION NETWORK

(71) Applicant: Telefonaktiebolaget LM Ericsson (publ), Stockholm (SE)

(72) Inventors: Badawi Yamine, Beirut (LB); Iana Siomina, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 396 days.

(21) Appl. No.: 17/917,728

(22) PCT Filed: Apr. 8, 2020

(86) PCT No.: PCT/SE2020/050369
§ 371 (c)(1),
(2) Date: Oct. 7, 2022

(87) PCT Pub. No.: WO2021/206596
PCT Pub. Date: Oct. 14, 2021

(65) Prior Publication Data
US 2023/0164590 A1    May 25, 2023

(51) Int. Cl.
*H04W 24/00* (2009.01)
*H04W 24/02* (2009.01)
*H04W 24/10* (2009.01)

(52) U.S. Cl.
CPC ........... *H04W 24/02* (2013.01); *H04W 24/10* (2013.01)

(58) Field of Classification Search
CPC .. H04W 24/02; H04W 24/10; H04W 370/329
See application file for complete search history.

(56) References Cited

U.S. PATENT DOCUMENTS

| | | | |
|---|---|---|---|
| 9,584,966 | B1 | 2/2017 | Thiel et al. |
| 10,057,802 | B2 * | 8/2018 | Gunnarsson .......... H04W 24/10 |
| 10,484,882 | B2 * | 11/2019 | Torsner ............... H04W 36/085 |
| 2003/0061009 | A1 | 3/2003 | Davis et al. |

(Continued)

FOREIGN PATENT DOCUMENTS

| | | | |
|---|---|---|---|
| GB | 2481254 | A | 12/2011 |
| JP | 2013038583 | A * | 2/2013 |

(Continued)

OTHER PUBLICATIONS

International Search Report and Written Opinion of the International Searching Authority, PCT/SE2020/050369, mailed Dec. 10, 2020, 11 pages.

(Continued)

Primary Examiner — Khai M Nguyen
(74) Attorney, Agent, or Firm — Sage Patent Group

(57) ABSTRACT

A method performed by a radio network node for handling a radio degradation in a wireless communication network. The radio network node detects the radio degradation in a radio coverage area served by the radio network node. The radio network node further identifies at least one target wireless device to inform about the radio degradation. The radio network node then transmits a notification of the detected radio degradation to the at least one identified target wireless device.

22 Claims, 11 Drawing Sheets

(56) References Cited

U.S. PATENT DOCUMENTS

2009/0286526 A1    11/2009  Matsunaga
2020/0153688 A1*    5/2020  Wirola ................ H04W 64/003

FOREIGN PATENT DOCUMENTS

WO    WO 2016/160230 A1    10/2016
WO    WO-2017003338 A1 *   1/2017

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.4.0 (Dec. 2018), 933 pages.
First Office Action, IN Patent Application No. 202217055395, mailed May 1, 2025, 5 pages.

* cited by examiner

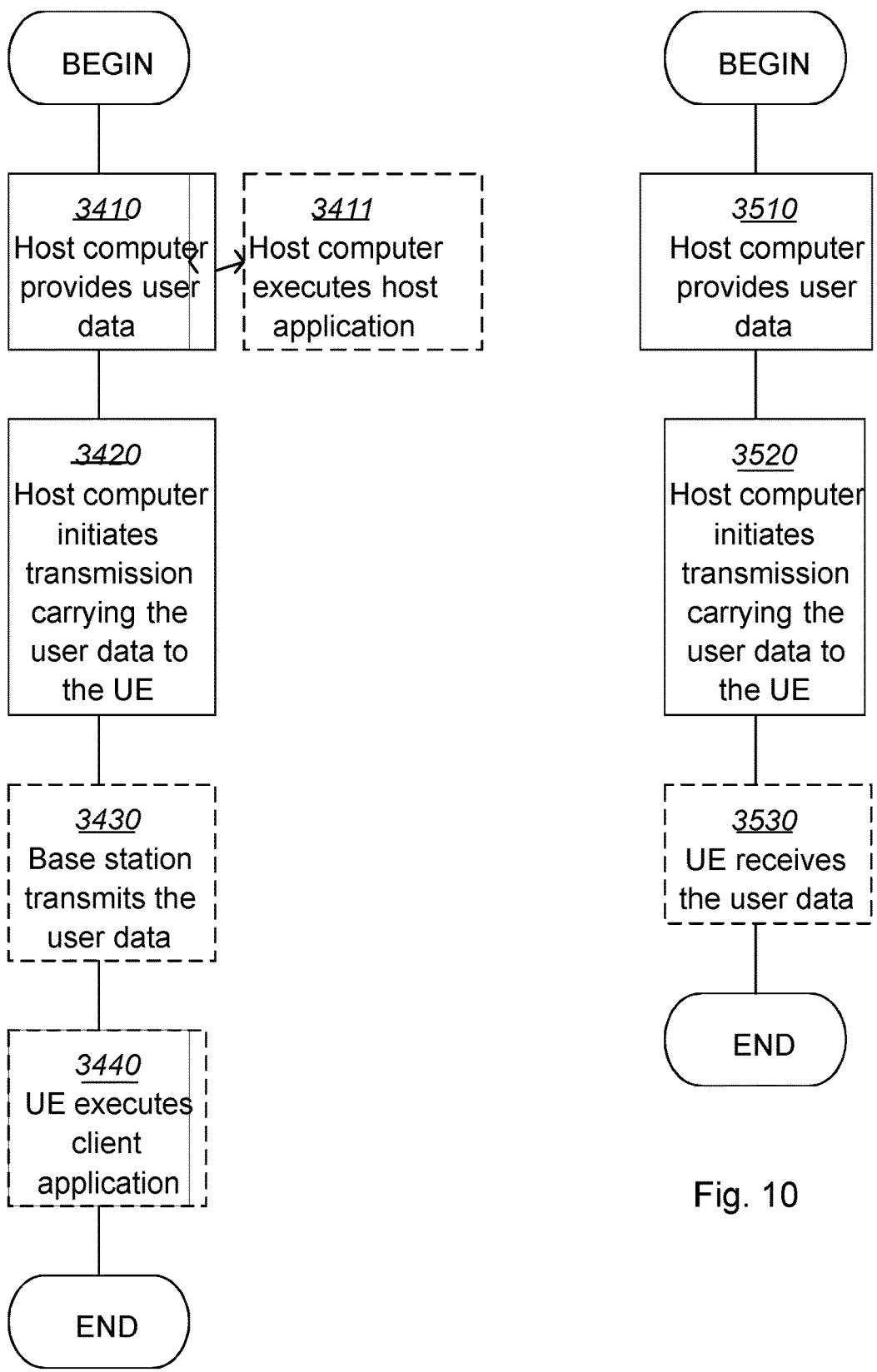

RADIO NETWORK NODE AND METHOD PERFORMED THEREIN FOR COMMUNICATION IN A WIRELESS COMMUNICATION NETWORK

CROSS REFERENCE TO RELATED APPLICATIONS

This application is a 35 U.S.C. § 371 national stage application of PCT International Application No. PCT/SE2020/050369 filed on Apr. 8, 2020, the disclosure and content of which is incorporated by reference herein in its entirety.

TECHNICAL FIELD

Embodiments herein relate to a radio network node and method performed therein. In particular, embodiments herein relate to handling communication in a wireless communication network.

BACKGROUND

In a typical wireless communication network, user equipment (UE), also known as wireless communication devices, mobile stations, stations (STA) and/or wireless devices, communicate via a Radio Access Network (RAN) with one or more core networks belonging to different network operators. The RAN covers a geographical area which is divided into areas or cell areas, with each area or cell area being served by a radio network node, e.g., a Wi-Fi access point or a Radio Base Station (RBS), which in some networks may also be called, for example, a NodeB, eNodeB or a gNodeB. The area or cell area is a geographical area where radio coverage is provided by the radio network node. The radio network node communicates over an air interface operating on radio frequencies with the UE within range of the radio network node.

A Universal Mobile Telecommunications System (UMTS) is a third generation telecommunication network, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipment. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several radio network nodes may be connected, e.g., by landlines or microwave, to a controller node, such as a Radio Network Controller (RNC) or a Base Station Controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes which can be connected directly to one or more core networks, i.e. they do not need to be connected to the core via RNCs.

With the emerging 5G technologies such as New Radio (NR), the use of a large number of transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals coming from a selected direction or directions, while suppressing unwanted signals coming from other directions.

In this disclosure, the term "radio degradation" is used to denote a state or situation when radio communication in an area or location is poor in some sense, meaning that the radio communication between UEs and the RAN is basically not working as required. An area or location where radio degradation occurs will be referred to as "location X" for short, while the current location of a wireless device is sometimes referred to as "location L". A radio degradation may result in a failure to fulfil any service requirements, e.g. with respect to data rate, latency and quality, or even lost connection. A radio degradation may be caused by poor signal quality, interference, malfunction of equipment, inadequate settings or configurations in the UE or RAN, insufficient radio resources or capacity, and so forth.

Radio degradation may comprise one or more of: any performance degradation associated with radio environment such as increased Block Error Rate (BLER), increased interference, increased failure probability, e.g., mobility or handover failure, RLF, beam failure, increased dropping rate, radio signal strength or quality dropped by more than a certain amount or below a given threshold. Radio degradation is assumed to be significant, e.g. beyond fading effects, temporary or for which the network cannot be re-planned or re-dimensioned. Furthermore, radio degradation may occur due to some factors internally or externally to the network.

Radio degradation may occur in every wireless network. Once it occurs, Self-Organizing Network (SON) features may be automatically triggered to solve the degradation as soon as possible. However, a more efficient solution to handle radio degradation while enabling saving UE and network resources is lacking in the prior-art.

SUMMARY

An object of embodiments herein is to provide a mechanism that handles communication in a more efficient manner.

According to an aspect the object is achieved by providing a method performed by a radio network node for handling radio degradation in a wireless communication network. The radio network node detects a radio degradation in a radio coverage area served by the radio network node. The radio network node further identifies at least one target wireless device to inform about the radio degradation. The radio network node then transmits a notification of the detected radio degradation to the at least one identified target wireless device.

According to another aspect the object is achieved by providing a radio network node for handling radio degradation in a wireless communication network. The radio network node is configured to detect radio degradation in a radio coverage area served by the radio network node. The radio network node is further configured to identify at least one target wireless device to inform about the radio degradation. The radio network node is further configured to transmit a notification of the detected radio degradation to the at least one identified target wireless device.

It is furthermore provided herein a computer program product comprising instructions, which, when executed on at least one processor, cause the at least one processor to carry out the method above, as performed by the radio network node. It is additionally provided herein a computer-readable storage medium, having stored thereon a computer program product comprising instructions which, when executed on at least one processor, cause the at least one processor to carry out the method according to the method above, as performed by the radio network node.

Embodiments herein are based on the realisation that as the radio network node identifies at least one target wireless device to inform about the detected radio degradation and then transmits a notification of the detected radio degradation to the at least one identified target wireless device, the radio network node only needs to inform the affected wireless devices in the cell about the radio degradation instead of informing all wireless devices in the cell. Thereby, the communication is handled in a more efficient manner and the power consumption of the one or more wireless devices is decreased.

BRIEF DESCRIPTION OF THE DRAWINGS

Examples of embodiments herein are described in more detail with reference to attached drawings in which:

FIG. 9 illustrates methods implemented in a communication system including a host computer, a base station and a user equipment in accordance with some embodiments;

FIG. 10 illustrates methods implemented in a communication system including a host computer, a base station and a user equipment in accordance with some embodiments;

DETAILED DESCRIPTION

Figure 1:
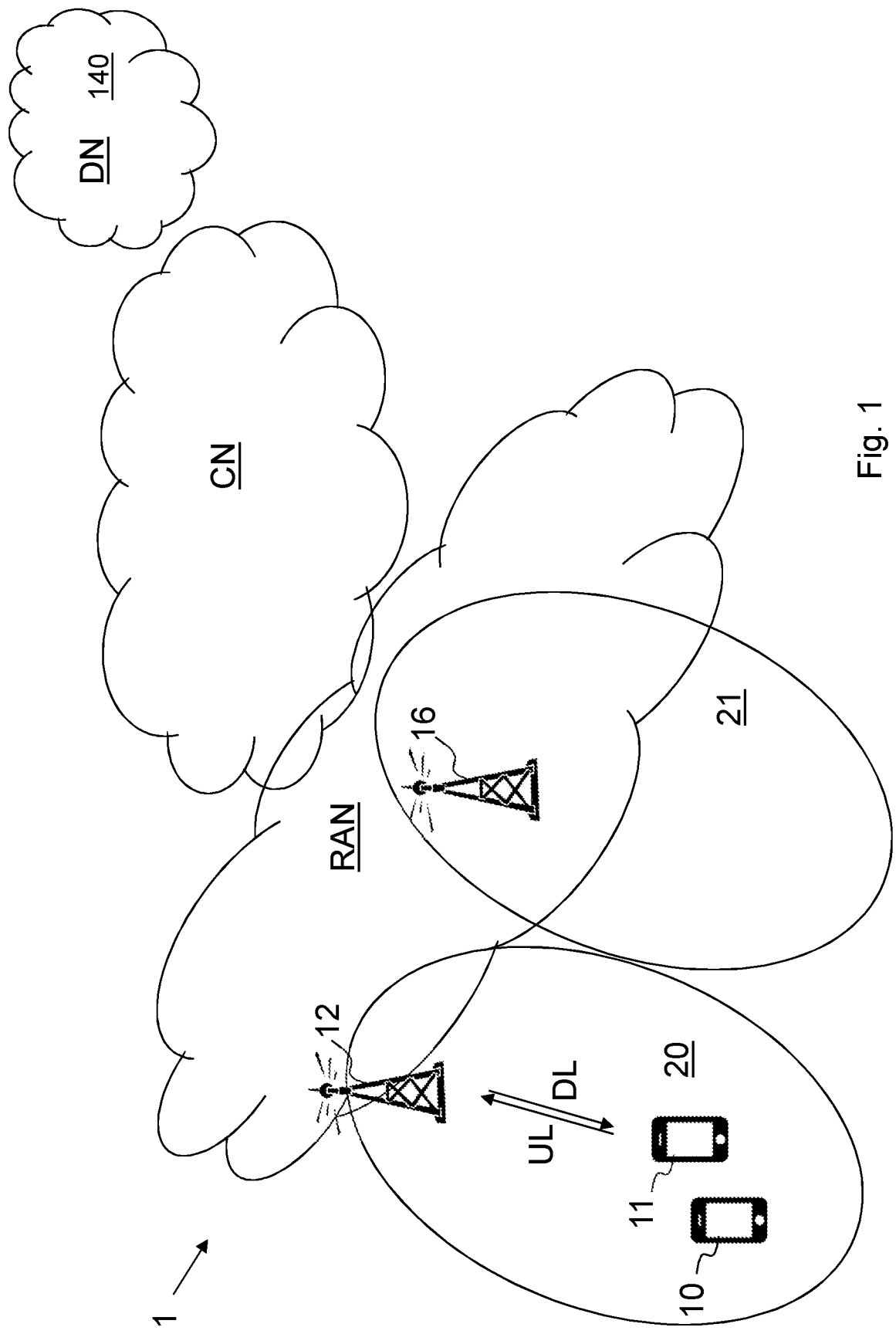
FIG. 1 is a schematic communication scenario illustrating embodiments of a wireless communications network.

An efficient reaction by the network to a radio degradation, e.g. performance degradation, may comprise two operations that may be performed simultaneously:

In a first operation the network may try to solve the issue causing the degradation, e.g. by using SON features.

In a second operation the network may broadcast to all UEs in the cell the location, e.g. location X, of the degradation so that all UEs in the cell calculate their actual location and compare their location to location X in order to take certain precaution when being close to or within the degraded area. E.g. a driverless car may avoid passing by the location X where the radio degradation has occurred by selecting another road.

It would be useful to propose methods to make the second operation more efficient while saving UE and network resources. This may be performed by letting a minimum number of UEs and/or only those UE which are sufficiently close to location X, calculate their actual location and compare their actual location to location X. The methods described herein are provided by examples and some of them are for LTE, however, the embodiments are generic to apply also for any Radio Access Technology (RAT) such as 2G, 3G or 5G.

As part of developing embodiments herein a problem related to radio degradation has been identified and will be discussed below:

In the prior art, there are solutions where the network provides notifications to UEs about a location X of a radio degradation. A downside with the prior art is that every single UE in a cell has to compare its actual location to the location X where the radio degradation has occurred, which unnecessary consumes UE resources. Furthermore, the comparison may be continuous, or periodic, or may need to be done multiple times.

In prior art, when a UE, e.g. UE1, located in a cell, e.g. cell1 experiences a certain radio degradation at a specific location X, it will then report preferably in real time the location X to the network, e.g. via dedicated signaling to a suitable network node. UE1 may be in idle or in connected mode. The reason for that reporting is that on one hand the network is enabled to take an action to solve the issue and on the other hand any UE2 moving into the area of degradation is enabled to avoid such degradation which might be useful depending on which type of UE is passing by that area, e.g. a driverless car. As a consequence, one immediate reaction from the network could be to broadcast the location X to all UEs in cell1 so that all other UEs may take a precaution while being close to the location X of degradation.

For example, it may be assumed that there were 1000 UEs present in a cell, e.g. cell1 when the network has broadcasted information about the degradation in location X to all UEs. Note that if the network does not broadcast the location X to all UEs in the cell, then there is no other way for the UEs to know about the location X but to learn about the degradation via experiencing this itself and losing in service performance. However, sending the location X to all UEs has currently also a drawback illustrated in the following example:

In another example, the area of degradation, location X, could be located in a very quiet area, even worse, X could be small and located inside a house where at most only a few subscribers with UEs will be present at a time. Suppose that there are 1000 UEs in cell1 at the time of degradation. A problem with prior art that has been recognized is that once location X is broadcasted then all the 1000 UEs while performing calls or any other activity, have to compare their actual location to location X even though they may be relatively far from location X though within the same cell. In other words, even if the degradation might occur within a house affecting only a few subscribers, e.g. there may be only three residents with UEs in that house, in prior art every other UE in cell1, in the above example 1000–three residents=997 UEs, will have to compare their actual location to the broadcasted location X in order to decide whether a certain action is necessary, e.g. a driverless car might avoid passing by location X or perform a handover or cell reselection.

A problem in prior art is that even though it is very unlikely that the 997 subscribers in that cell1 would pass by that specific area of degradation, a house in the above example, all UEs in the cell still have to calculate their actual location, which may be resource consuming, and compare it with location X. In fact, letting all other UEs, 997 UEs in the above example, to waste processing and battery consumption while calculating their actual location, e.g. via embedded mobile phone Global Positioning System (GPS), knowing in advance that they will never pass by location X, is an inefficient procedure that needs to be performed when prior art procedures are used. Such disadvantage of prior art becomes even more significant when the degradation remains long until the issue is solved. For example, if a radio degradation in location X is being broadcasted repeatedly for 1 hour, the UEs in cell1 have to calculate their actual location more than once especially in case they are moving in order to always be able to compare their actual current location to location X. For example, a moving UE might have to continuously calculate its location, e.g. periodically, so that once it is close to the degradation, it performs a predefined action.

Embodiments herein relate to wireless communications networks in general. FIG. 1 is a schematic overview depicting a wireless communications network, such as a wireless communications network 1. The wireless communications network 1 comprises one or more Radio Access Networks (RANs) and one or more Core Networks (CNs) and the following examples involve just one RAN associated with one CN for simplicity, although the embodiments herein are not limited in this respect. The wireless communications network 1 may use one or a number of different technologies for communication. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 1, a target wireless device 10 and a reporting wireless device 11, such as a UE, are present. Each of the target wireless device 10 and the reporting wireless device 11 may be a mobile station, a non-access point (non-AP) station (STA), a STA and/or a wireless terminal, communicating via e.g. one or more Access Networks (ANs), e.g. RANs, to one or more CNs. It should be understood by the skilled in the art that "UE" is a non-limiting term which means any terminal, wireless communications terminal, user equipment, Narrowband Internet of Things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communication network 1 comprises a radio network node 12 providing radio coverage over a geographical area, a service area, e.g. a radio coverage area 20 such as a cell, of a RAT, such as NR, LTE or similar. The wireless communication network 1 further comprises a neighbour network node 16 providing radio coverage over a geographical area, a service area, e.g. a neighbouring radio coverage area 21 such as a cell, of a RAT, such as NR, LTE or similar. The radio network node 12 may provide a transmission point and a reception point, and may be implemented as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node 12, depending e.g. on the RAT and terminology used. The radio network node 12 may be referred to as a serving radio network node wherein the service area may be referred to as a serving cell, and the serving network node communicates with the wireless device in form of downlink (DL) transmissions to the wireless device and uplink (UL) transmissions from the wireless device. It should be noted that a service area may be denoted as cell, beam, beam group or similar to define an area of radio coverage.

Methods and actions according to embodiments herein may for example be performed by the radio network node 12. As an alternative, a Distributed Node (DN) and functionality, e.g. comprised in a cloud 140 as shown in FIG. 1 may be used for performing or partly performing the methods and actions described herein.

According to embodiments herein the radio network node 12 detects radio degradation in the radio coverage area 20 served by the radio network node 12, e.g. based on at least one measurement report received from the at least one reporting wireless device 11, and identifies at least one target wireless device 10 to inform about the radio degradation. The radio network node then transmits a notification of the detected radio degradation to the at least one identified target wireless device 10.

Figure 2:
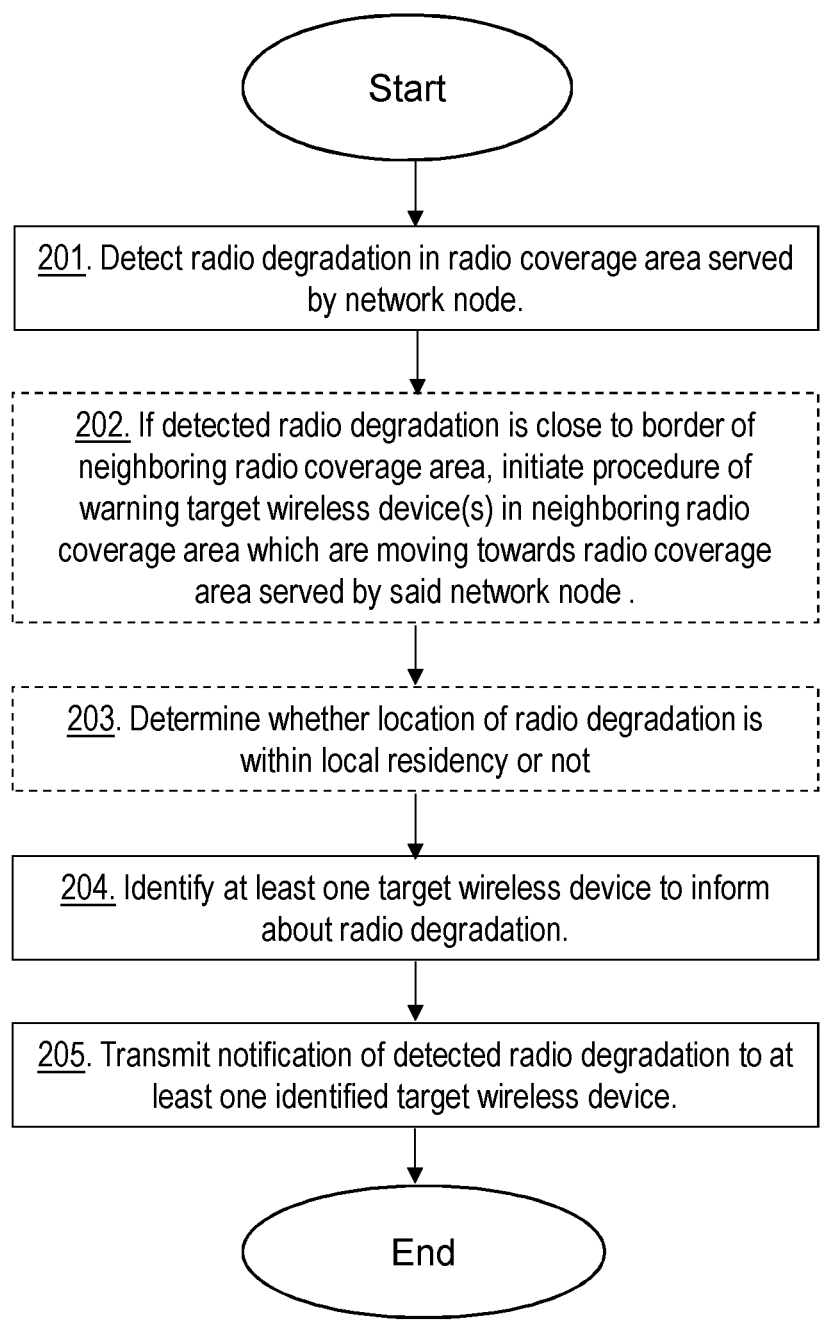
FIG. 2 is a flowchart depicting a method performed by a radio network node according to embodiments herein.

Some actions that may be performed by the radio network node 12 for handling radio degradation in the wireless communication network according to embodiments herein, will now be described with reference to a flowchart depicted in FIG. 2. The actions do not have to be taken in the order stated below, but may be taken in any suitable order. Optional actions that may be performed in some embodiments are marked with dashed boxes. The at least one reporting wireless device 11 is a reporting wireless device which sends measurement reports to the radio network node 12 and the at least one target wireless device 10 is a wireless device that receives the notification of the detected radio degradation.

Action 201. The radio network node 12 detects radio degradation in the radio coverage area 20 served by the radio network node 12.

The detecting may be based on at least one measurement report received from the at least one reporting wireless device 11 present in the radio coverage area 20. In some embodiments, the at least one measurement report comprises radio related measurements that fulfil a predefined radio degradation condition. The predefined radio degradation condition may be based on a threshold value of one or more radio related parameters measured by the reporting wireless device 11 and/or the radio network node 12.

Action 202. If the location of the detected radio degradation is close to a border of another cell, e.g. the neighbouring radio coverage area 21, then the neighbouring radio coverage area 21 may broadcast the location of the degradation to the wireless devices in the neighbouring radio coverage area 21, together with an identity of the radio coverage area. Thereby any wireless device performing a handover towards the radio coverage area 20 may take some precaution, e.g. avoid handover execution, into consideration. This will be described more in detail further below. Thus, according to some embodiments, if the location of the detected radio degradation is close to a border of the neighbouring radio coverage area 21, the radio network node 12 may optionally initiate in the neighbouring radio coverage area 21, a procedure of warning one or more target wireless devices in the neighbouring radio coverage area 21, which are moving towards the radio coverage area 20 served by said radio network node 12. Such movements of the target wireless devices may be detected e.g. by using any conventional procedures related to positioning of wireless devices.

Action 203. In some embodiments, the radio network node 12 may optionally determine whether the location of the radio degradation is within a local residency or not.

In some embodiments, it may be further determined that the location of the radio degradation 20 is within the local residency when at least one of the following conditions is verified:

At least one reporting wireless device 11 is/are moving with a velocity which is below a threshold. The velocity and/or speed may be reported by the reporting wireless device 11. The velocity and/or speed of the reporting wireless device 11 may also be obtained by using any conventional procedures related to positioning of the reporting wireless device 11, as performed by the radio network node 12;

The location of the radio degradation is within a local residency according to a geographic map;

Measurements reported from the at least one reporting wireless device 11 is below a threshold within a time interval;

A wireless device movement range is below a threshold.

Action 204. When radio degradation in the radio coverage area 20 has been detected in accordance with action 201, the radio network node 12 selectively decides whether to notify all wireless devices in the cell or not, e.g. for warning the devices or to trigger a preventive action by the devices. The radio network node 12 thus identifies at least one target wireless device 10 to inform about the radio degradation. In some embodiments the identifying the at least one target wireless device 10 may comprise determining if the at least one target wireless device 10 is moving towards the location of the radio degradation, e.g. based on the location of the radio degradation.

Action 205. The radio network node 12 then transmits a notification of the detected radio degradation to the at least one identified target wireless device 10. The notification may be transmitted as a broadcast, a multicast or a unicast. In some embodiments, the notification may be transmitted if it was determined in action 203 that the location of the radio degradation is not within a local residency.

In some embodiments, the transmitting of the notification may be based on a level of radio degradation impact, meaning basically that the notification may only be transmitted if the level of radio degradation impact is high enough, e.g. exceeds a certain threshold. The level of radio degradation impact may be based on at least one of: the number of measurements reported from the at least one reporting wireless device 11, the location of the at least one reporting wireless device 11 or the speed of the at least one reporting wireless device 11. The level of degradation impact may thus be related to the severity of the radio degradation, e.g. the radio degradation, and/or the number of impacted wireless devices.

Some of the embodiments herein, as mentioned above, will now be further described and exemplified. The text below is applicable to and may be combined with any suitable embodiment(s) described above.

The radio network node 12 may be e.g. a base station, a device in a vehicle-to-vehicle (V2V), vehicle-to-everything (V2X) or V2V or a side link communication.

The embodiments herein are not limited to any specific RAT(s) and may apply for LTE, NR or any other RAT.

The embodiments herein are not limited to a specific wireless device activity level, e.g. the embodiments herein may be applicable for a wireless device in RRC_CONNECTED, RRC_IDLE, or RRC_INACTIVE. The notification of the radio degradation may sometimes be referred to as radio degradation information or degradation area information. The location of the radio degradation may sometimes be referred to as degradation area or location X.

In an example, the radio network node 12 detects, e.g. determines, a radio degradation, in a degradation area, e.g. upon an indication from one or more wireless devices 11, and informs other wireless devices, such as the above-described at least one target wireless device 10, about the radio degradation. However, the informing may be based on a metric, e.g. maintained by the radio network node or by another controlling node, indicative of the level of degradation impact, e.g. related to the number of wireless devices affected by the degradation.

The level of degradation impact may be divided into different groups depending on the impact level. If the level of degradation impact is in a first group, e.g. if the estimated number of affected wireless devices are above a threshold, then one of three actions may be taken which will be denoted the first, second and third actions in the examples below. Similarly, the examples below may be extended to three or more levels of degradation. An example of the first action can be to broadcast degradation area information, which may comprise location of the degradation, and/or informing a neighbour cell such as the neighbouring radio coverage area 21, e.g. that the location of the degradation is at the border of a cell or in the area of coverage of two or more cells. An example of the second action can be e.g. to determine one or a group (e.g. a multicast group) of target wireless devices 10 which need to receive the degradation area information and to send the degradation area information, e.g. the location of the degradation, to these one or more target wireless devices 10. An example of the third action may be to refrain from sending the location of the degradation to the target wireless devices 10 at all.

Furthermore, in another example, the degradation area information may also implicitly or explicitly control, in the receiving target wireless device 10, whether to perform (re)calculation of the target wireless device's location or not and whether to compare the target wireless device's 10 location, old or recalculated, to the received location of the degradation.

The examples of the first and second actions mentioned above will now be described more in detail.

First action: Selectively deciding in the radio network node 12 whether or not to broadcast, multicast or unicast the location X, e.g. the location of the radio degradation, to all wireless devices 10 in a cell, e.g. for warning the devices or to trigger a preventive action in the devices, and providing the radio degradation information, e.g. the detected radio degradation, accordingly. The radio degradation information may comprise location X and in some examples may further comprise an indication of the level of degradation impact related to the severity of the radio degradation and/or the number of impacted wireless devices. The radio degradation information may be provided to some or all wireless devices in the cell if location X is comprised in the cell or in a neighbour cell. The subset of wireless devices may be determined based on location X and/or based criticality of the radio degradation. Determining criticality of the degradation might be based on setting and/or defining different threshold for the same type of degradation. E.g. if a Reference Signal Received Power (RSRP) is <−100 dbm then it is degraded, e.g. critical, but if RSRP is <−112 dbm then it is very degraded, e.g. very critical. Furthermore, if the radio degradation information is determined to be delivered to a subset of wireless devices in the cell, this may be achieved by broadcasting or multicasting in one or more portions of the cell comprising or being close to location X, e.g., via transmission points (TRP) or narrow coverage directional antennas, and/or by encoding the radio degradation information so that it may be read only by the determined intended subset of wireless devices, and/or by transforming the location X, and its proximity, into a set S of radio characteristics and indicating to the wireless devices that only wireless devices having radio characteristics comprised in the set S shall receive the information. The radio characteristics may be e.g., signal strength or quality of the serving cell within a first range and signal strength or quality of a neighbour cell within a second range.

Second action: Controlling in the target wireless device 10 the triggering of the calculation of the target wireless device's 10 current location L and comparing it to the location X. This may be controlled by means of a rule based on the set S, e.g. do not calculate if the target wireless device's radio characteristics are beyond set S. This may further be controlled by means of selective broadcast, multicast or unicast over one or more portions of the cell described above so that all target wireless devices 10 that are able to receive and read the information shall compare their current location to location X, while avoiding this action in other wireless devices 10 of the same cell.

Furthermore, the degradation information may also implicitly or explicitly control, in the target wireless device 10, whether to perform the (re)calculation of the target wireless device's location L or not and whether to compare location L, old or recalculated, to the received location X. This may be an explicit indicator, e.g. binary, or a pre-defined rule or a rule signalled together with the degradation information.

The pre-defined rule may comprise to always recalculate if received location X or recalculate upon certain conditions, e.g. battery level of the target wireless device 10 and/or the target wireless device's radio conditions such as a weak signal or speed or displacement of the target wireless device 10 is above a threshold.

The level of degradation impact may be specific to the type of degradation. E.g. some types of degradation may depend not only on the location but also on the capabilities of the target wireless device 10, receiver techniques, cell size, etc. For example, for a first type of radio degradation ten affected wireless devices may be already too high while for a second type of degradation one hundred affected wireless devices may be medium criticality and may be determined, e.g., based on any one or more of:

- A metric related to the service quality or signal quality degradation, e.g. amount of increased interference, BLER, UE dropping or failure probability, or decreased signal strength, etc.;
- Serving cell size, e.g., a macro cell or a hot spot with dense radio traffic may be associated with a higher level of degradation impact than a small cell which is not a hot spot;
- The number of received degradation reports received so far from different wireless devices 11, where many reports may imply many affected wireless devices, from its own cell or a neighbour cell such as the neighbouring radio coverage area 21, e.g. at the cell edge;
- The number of received degradation reports received so far from different wireless devices 11 with certain capabilities or receiver types, where many reports may imply many affected wireless devices, from its own cell or the neighbour cell, e.g., at the cell edge;
- Wireless device home residence information, e.g., UE reporting degradation from its own house may be indicative of a potentially lower degradation impact level than UE reporting degradation from a public place, which may be "home" cell or home address, etc.;
- A geographic map such as a google map, building map, shopping mall map, city or block map, or environment type such as a park, office area or subway;
- Time of the day, calendar day, season, scheduled event, e.g. office hours may be associated with a higher level of degradation impact in an office area or a popular public place during its popular hours may be associated with a higher level of degradation impact.

An entity or function denoted 'estimate number affected UEs', may be created at the Operating Support System (OSS) of the network or at a remote server connected to the OSS. That entity or function has the role to estimate the number of UEs that might be affected each time the radio degradation occurs. This could be done by taking its input from Google map (first input) or from Key Performance Indicator (KPI) at OSS (second input) or others. When a UE reports a location X of degradation in one cell, cell1 then the above-mentioned entity or function estimates the number of affected UEs. In V2X/V2V/side link this may be the number of neighbours. If it is low, e.g. if the radio degradation is affecting a small house, then the radio network node 12 does not broadcast location X to the UEs in cell1. Otherwise the radio network node 12 should broadcast location X to the UEs in cell1 and then the first or second actions mentioned above could be applied.

An advantage of embodiments herein is that there is a possibility to save resources of the wireless devices by preventing unnecessary (re)calculation of their location when there is an area of radio degradation nearby, which is especially critical in emergency situations.

The first, second and third actions mentioned above are further described by some examples below, denoted examples 1, 2 and 3.

Example 1: The network decides to broadcast the location X of the degradation or not depending on an external map and number of degradation reports coming from UEs, e.g. wireless devices 10. E.g. it may be possible to broadcast if the number of UEs in the cell is small and the degradation area is large.

Example 2: The network decides to broadcast the location X of the degradation or not only depending on the number of reported degradations coming from UEs.

Example 3: The degradation is occurring close to the border of the serving cell, e.g. the radio coverage area 20.

Figure 3A:
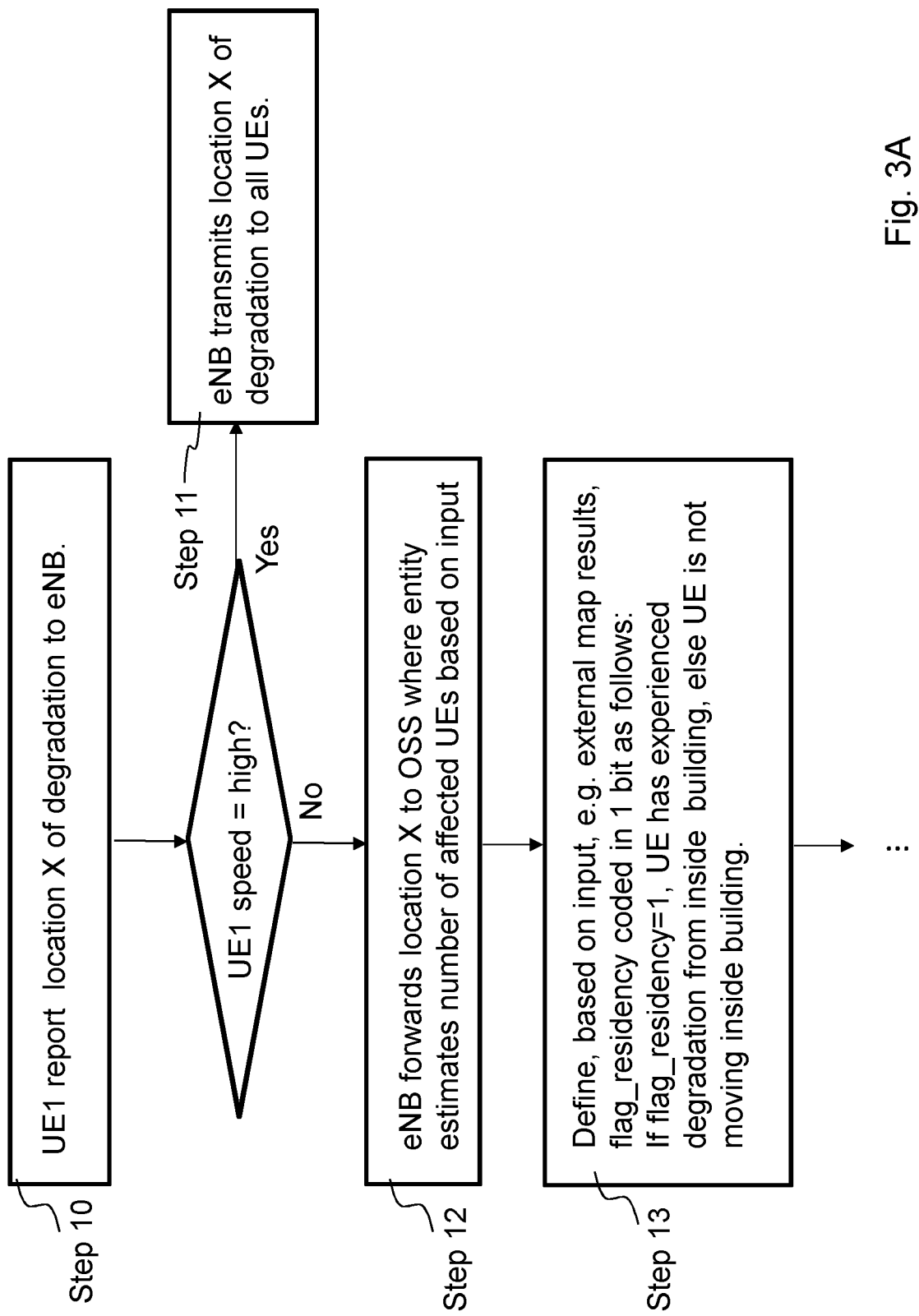
FIG. 3A is a flowchart illustrating an example of how some embodiments herein may be used.
Figure 3B:
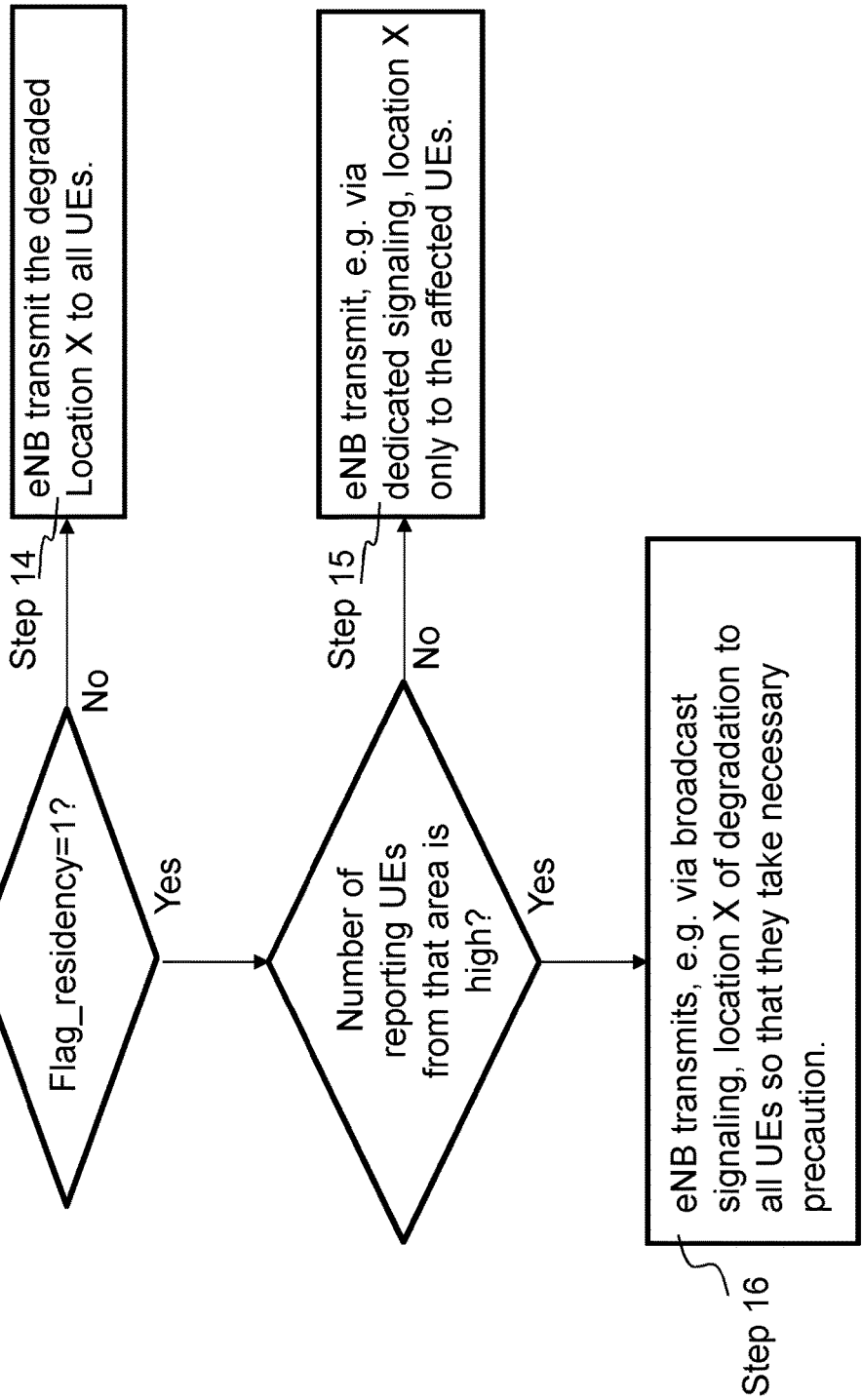
FIG. 3B is a continuation of the flowchart of FIG. 3A.

Example 1 will now be described in accordance with FIG. 3A and FIG. 3B. FIGS. 3A and 3B illustrate a flowchart according to some embodiments herein for handling the communication in the communication network, where FIG. 3B is a continuation of FIG. 3A. FIGS. 3A and 3B comprise the steps 11-16 where the order of the steps may vary in different implementations.

The main objective of example 1 is letting the network decide whether to broadcast the location X where the degradation has occurred to all UEs in the cell or not. I.e. the radio network node 12 decides whether to broadcast the location of the radio degradation to all wireless devices 11 in the radio coverage area 20 or not. The decision may be based on at least three inputs:

UE velocity or speed (Step 11);
An external map (Step 12);
Number of UEs that are reporting the same degradation within a predefined period of time (Steps 15 and 16).

Additional inputs or other information, not described here, might also be used for the same objective of example 1.

Step 10: The reporting wireless device 11, referred to as UE1 in FIG. 3A, in idle or in connected mode, reports the location of radio degradation, e.g. location X, to the radio network node 12, e.g. eNB. The location may be reported via an RRC MeasurementReport message.

Step 11: In this next step the velocity and/or speed of the reporting wireless device 11 is taken into consideration. The velocity and/or speed may be reported by the reporting wireless device 11. The velocity and/or speed of the reporting wireless device 11 may also be obtained by using any conventional method by the network. Based on this information, the following actions may be taken:

If the velocity/speed of the reporting wireless device 11 is ≥a predefined threshold, e.g. threshold1, which may mean that the reporting wireless device 11 is moving at high velocity/speed and is unlikely to be moving inside a private or residential area which are typically more limited in space, the radio network node 12 will broadcast the location X of the degradation to all wireless devices 11 in the cell, as it is more likely that other wireless devices later might pass that location X and hence it is useful to warn them beforehand.

Otherwise, if the velocity/speed of the reporting wireless device 11 is <predefined threshold1, it may mean that the reporting wireless device 11 has experienced a radio degradation either from inside a building or from outside a building. E.g. a subscriber is running or walking on a road or in a mall. In order to improve the accuracy, the network may consult an external geographical map as described in the next step (Step 12).

Velocity may also comprise movement direction information, which may also be taken into account, e.g. different actions may be taken depending on whether the reporting wireless device 11 is moving towards or away from the radio degradation area.

Step 12 The radio network node 12 forwards the reported location X of degradation to the OSS where the entity, e.g. denoted 'estimate number affected UEs', will estimate the number of wireless devices that usually pass by the area of location X. The estimation may be with different levels of accuracy based on different input or combinations of inputs. Additionally, any of the inputs time, part of the day, day of the week or month/season etc. may also be used to make the estimation even more accurate.

1st input: The use of an external geographical map. The first input could be divided into two phases, and the number of affected wireless devices may be estimated after each phase or after the final phase (e.g., second phase if both phases are used or the first phase if the first phase is used only):

First phase: Determining the type of location and/or property type and/or purpose, e.g., private house, office building, main road, small road, which may be used in estimating the number of affected wireless devices. The estimation may be performed by calculation, mapping to some statistics or predefined numbers.

In some embodiments the number affected wireless devices may be estimated by using any external source that could give information about the nature of location X. Such source could be a Google map or any topological or building map to check the types of location X, e.g. if it is a house or a street. Such map might already be existing or not. In case such map does not exist, then the operator needs to build one. In a first phase, and in its simplest form, the map could tell if the location X is, e.g. a building or not.

Step 13: The purpose of this step is to determine whether the reported location X is inside a residency or not and the result may be illustrated with a parameter, denoted flag_residency as follows: if flag_residency=1 it means that the reporting wireless device 11 has experienced the radio degradation from inside the building. Otherwise if flag_residency=0 it means that the reporting wireless device 11 has experienced the radio degradation from outside the building.

Step 14: In case the result of the map for the reported location X is a non-residency, i.e. flag_residency=0, e.g. a road, then the radio network node 12 assumes that there may be new subscribers passing by the reported location X at any time and hence the radio network node 12 may send the location X of the radio degradation to all wireless devices in the cell so that the wireless devices heading to that location can take necessary precaution.

Step 15: The result of the map might not be accurate enough in some situations. For example, when the result of the map shows that location X is a building, i.e. flag_residency=1. In such scenario the OSS could not estimate exactly the number of wireless devices 11 being affected. The reasons for that are that the affected location in that building might be a flat where very few residents are located or it might be a mall inside that building where hundreds or thousands of subscribers might be passing during busy hours of the day. For this reason the third input take into consideration the number of UEs that report the same degradation within a predefined period of time.

If the number of wireless devices 11 reporting the radio degradation, within a predefined period of time T, are very few, e.g. typically less than 3 or 5, then the OSS entity may consider that it is most likely a flat and hence the radio network node 12 may take one of the following two actions:

It may not send the location X of the radio degradation to the rest of wireless devices in the cell as it is unlikely they will pass by that flat and thereby saving unnecessary processing and signalling for the rest of wireless devices in the cell.

It may send the location X of the radio degradation only to the target wireless devices 10 located in the affected area, e.g. in that particular flat. The radio network node 12 may use a dedicated signalling, e.g. rrcconnectionreconfiguration message, to communicate to those few UEs located in that flat.

Step 16: Otherwise if the number of wireless devices 11 reporting the radio degradation within a predefined period of time T are high, it may mean that the radio degradation is most likely occurring in a crowded public area inside the building, e.g. a mall or supermarket, and hence the radio network node 12 may send back the location of the radio degradation so that the wireless devices 11 nearby the location of the radio degradation will take the necessary precaution.

Figure 4:
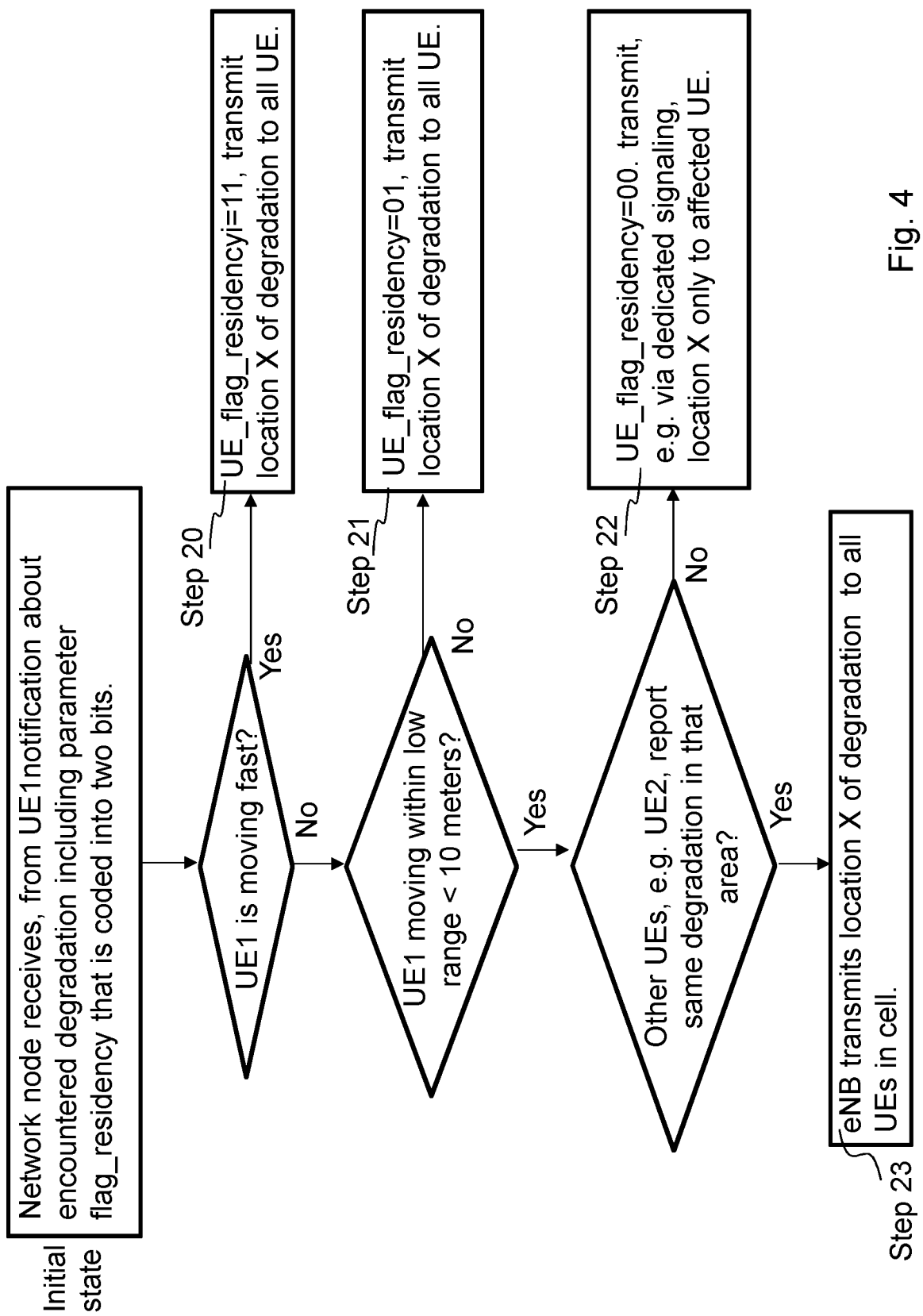
FIG. 4 is a flowchart illustrating another example of how some embodiments herein may be used.

Example 2 will now be described in accordance with FIG. 4. FIG. 4 illustrates a flowchart according to some embodiments herein for handling the communication in the communication network.

In example 1 described above, an external geographical map was used as an input to determine whether the reporting wireless device 11 is moving inside or outside the building. As an alternative where the geographical map is not required, example 2 may be used. Example 2 comprises introducing a new parameter called UE_flag_residency. This parameter takes into consideration velocity or speed information of the reporting wireless device 11 and the maximum range and/or distance the wireless device is making in its surroundings.

Initial State:

When the reporting wireless device 11 encounters a radio degradation, it triggers its accelerometer and gyroscope. The result is shown in a parameter, e.g. UE_flag_residency, which may be coded with two bits. Depending on the four possible outcomes of flag_residency the following steps 20-23 may be performed, where the order of the steps may vary in different implementations:

Step 20: If the reporting wireless device 11, e.g. UE1, is moving with a high speed/velocity then UE_flag_residency is =11. In such case, the network, e.g. radio network node 12, may send the location X of the radio degradation to all wireless devices in the cell.

If the reporting wireless device 11 is moving slowly then two scenarios are studied which are described in step 21 and step 22 below.

Step 21: When the reporting wireless device 11 is moving within a larger range, then the location X of the radio degradation is most probably a mall, and hence the UE_flag_residency is equal to another value, e.g. to 01. In such case, the radio network node 12 may send the location X of the radio degradation to all wireless devices in the cell.

Step 22: When the reporting wireless device 11 is moving within a certain range such as a ray or beam, e.g. extending 5 or 10 meters, it may mean that the location X of the radio degradation is considered as being a flat and once the reporting wireless device 11, e.g. UE1, reports the encountered radio degradation it sends UE_flag_residency=00. Here the information that the reporting wireless device 11 is moving slowly within a small ray does not tell by itself whether the reporting wireless device 11 is in a flat or whether it is in a hall, e.g. a shop in a mall or a wedding gathering hall. In fact suppose that at a location Y is inside a house when the reporting wireless device 11 reports a degradation to the network. And at another location Z, another wireless device, e.g. UE2, is inside a shop or a pharmacy when reporting the degradation to the network. Because both UE1 and UE2 are moving at very low speed, there is no way for the network to know from such information whether locations Y and Z are a residency or not. This is in contrast to step 11 above, where the reporting wireless device 11 is moving at high velocity, as the reporting wireless device 11 is e.g. is inside a car, is riding a bicycle or is running, which may indicate that the reporting wireless device 11 is not inside a residency. That is why a second factor, that is the number of degradation reports coming from the same area, from different wireless devices, may be involved in order for the radio network node 12 to take a more accurate decision and two scenarios are then considered. The idea is to check how many different wireless devices have experienced and reported the degradation from the same location. During each call some temporary as well as a permanent UE identity, e.g. International Mobile Subscriber Identity (IMSI), are reported to the network. Thanks to such information, the network may determine whether the number of reported degradations is coming from the same wireless device or from different wireless devices. For example, if the degradation occurs in a residency then very few different UEs may be affected and report the degradation, whereas if a degradation occurs in a shop or mall or wedding gathering then many different UEs may be affected and report the degradation. In other words, according to an example it may not be the number of degradation reports by itself that is counted. It may be the number of degradation reports coming from different UEs that is counted. In the first scenario, if, during a predefined period of time T, the number of reports coming from other wireless devices, e.g. UE2, that are reporting the same area of UE1 is very low, then the radio network node 12 may not send the location X of the radio degradation to all wireless devices in the cell.

Step 23: In the second scenario, if, during a predefined period of time T, the number of reports coming from other wireless devices, e.g. UE2, that are reporting the same area of UE1 is high, then the radio network node 12 may send the location X of the radio degradation to all wireless devices in the cell so that any wireless device moving to that area could take precaution.

Figure 5:
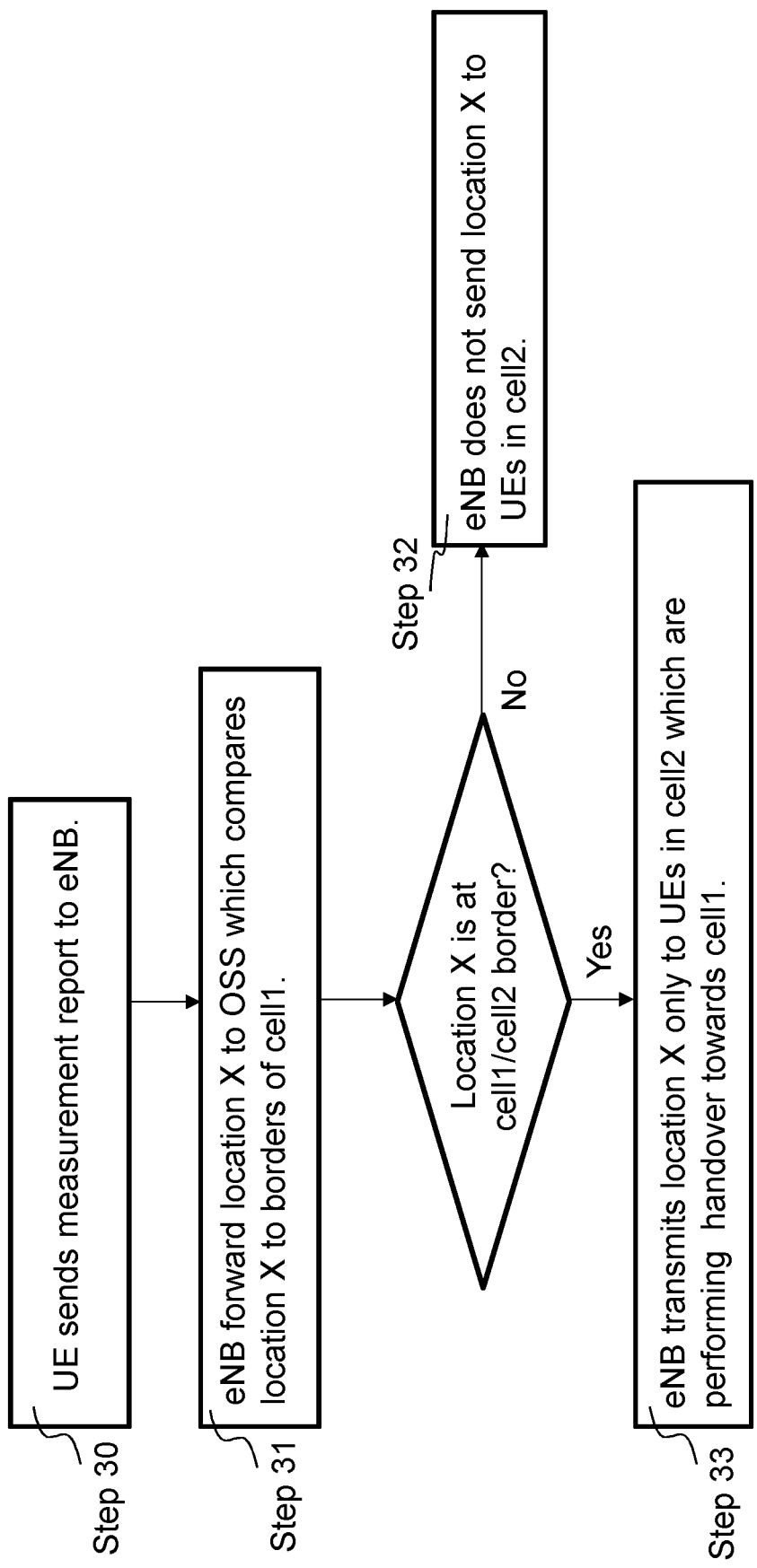
FIG. 5 is flowchart illustrating yet another example of how some embodiments herein may be used.

Example 3 will now be described in accordance with FIG. 5. FIG. 5 illustrates a flowchart according to some embodiments herein for handling the communication in the communication network. The reported location X of degradation is compared to the border of the serving cell.

Initial step: Every cell has built its own radio coverage map including the serving cell, e.g. cell1. In FIG. 5 the following steps 30-33 may be performed, where the order of the steps may vary in different implementations:

Step 30: The reporting wireless device 11, e.g. UE, sends its measurement report to the radio network node 12, e.g. eNB, which may then forward it to the OSS. The OSS may look at the location X of the degradation and applies the steps of example 1 and example 2 on all the wireless devices in the serving cell.

Step 31: In addition, the OSS may take an action on UEs in a neighbouring cell, e.g. cell2, as follows:

Step 32: If the location X of the radio degradation is not situated at the border of cent then the OSS may not send the location X to the wireless devices in cell2.

Step 33: Otherwise, if by chance the location X of the radio degradation is close to the border of another cell, e.g. cell2, then the OSS may ask the cell2 to broadcast the location X of the degradation to the wireless devices in cell2 together with the identity of the first cell so that any wireless device performing a handover towards cell1 may take some precaution, e.g. avoid handover execution, into consideration such that the location of degradation X which is located at the border with cell1 once it is moving towards cell1. The idea is that once cell2 has the identity of cell1 the network, via an intelligent SON feature could adjust one parameter of the handover formula in order to delay the handover. In that way the UE may have moved deep inside cell1 and passed location X on the border.

Figure 6:
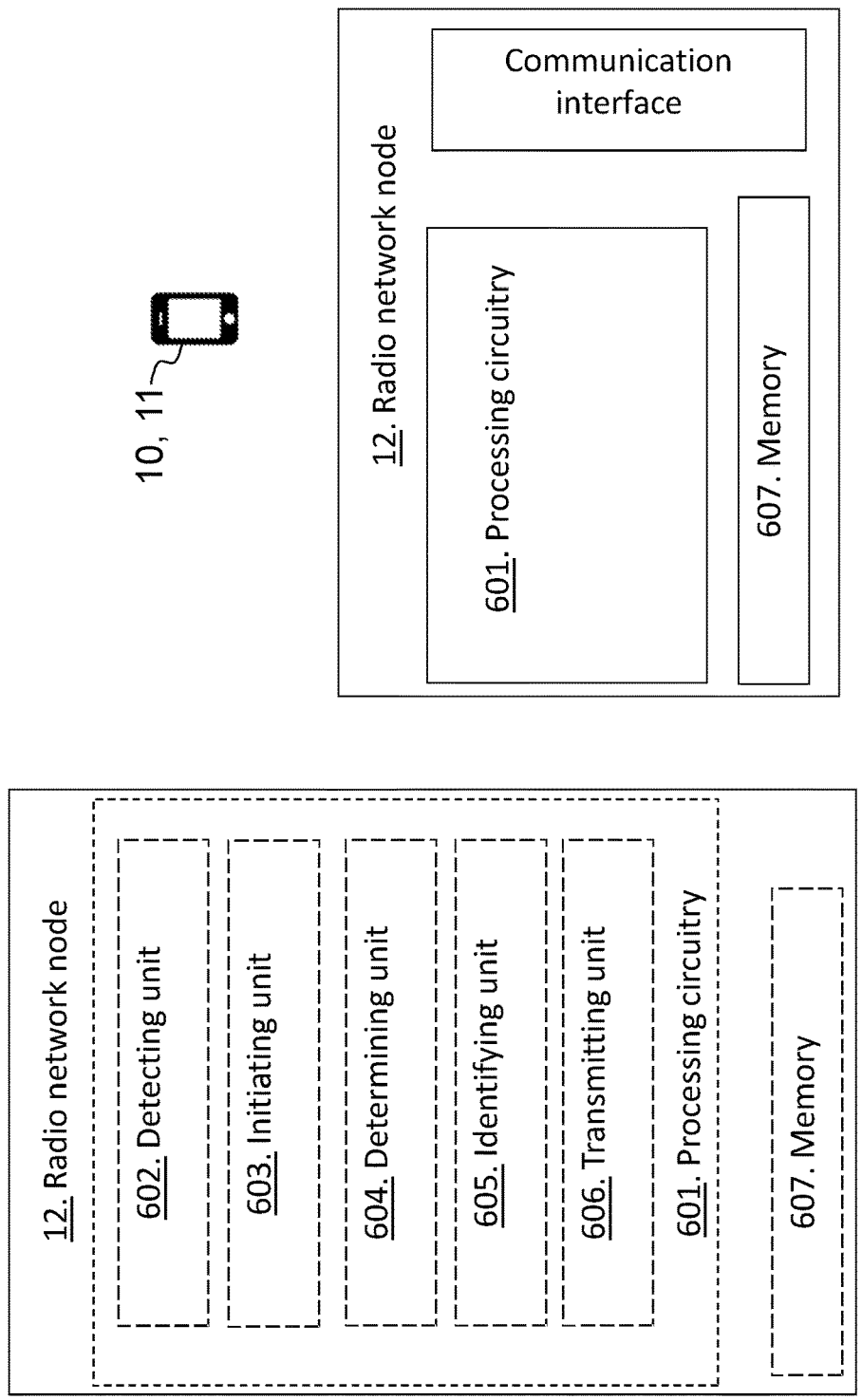
FIG. 6 is a schematic block diagram illustrating a radio network node according to some embodiments herein.

FIG. 6 is a block diagram depicting the radio network node 12 for handling radio degradation in the wireless communication network, according to embodiments herein.

The radio network node 12 may comprise processing circuitry 601, e.g. one or more processors, configured to perform the methods herein.

The radio network node 12 may comprise a detecting unit 602. The radio network node 12, the processing circuitry 601, and/or the detecting unit 602 is configured to detect radio degradation in the radio coverage area 20 served by the radio network node 12. The detecting may be based on at least one measurement report received from the at least one reporting wireless device 11 present in the radio coverage area 20. The at least one measurement report may be adapted to comprise radio related measurements that fulfil the predefined radio degradation condition.

The radio network node 12 may comprise an initiating unit 603. The radio network node 12, the processing circuitry 601, and/or the initiating unit 603 may be configured to, if the location 14 of the detected radio degradation is close to the border of the neighbouring radio coverage area 21, initiate in the neighbouring radio coverage area 21, the procedure of warning one or more target wireless devices in the neighbouring radio coverage area 21, which are moving towards the radio coverage area 20 served by said radio network node 12.

The radio network node 12 may comprise a determining unit 604. The radio network node 12, the processing circuitry 601, and/or the determining unit 604 may be configured to determine whether the location 14 of the radio degradation is within the local residency or not. It may be determined that the location 14 of the radio degradation 20 is within the local residency when at least one of the following conditions is verified:
- at least one reporting wireless device 11 is/are moving with a velocity which is below a threshold;
- the location (14) of the radio degradation is within the local residency according to the geographic map;
- measurements reported from the at least one reporting wireless device 11 are below a threshold within a time interval;
- the wireless device 10 movement range is below a threshold.

The radio network node 12 may comprise an identifying unit 605. The radio network node 12, the processing circuitry 601, and/or the identifying unit 605 is configured to identify at least one target wireless device 10 to inform about the radio degradation. The identifying the at least one target wireless device 10 may further comprise determining if the at least one target wireless device is moving towards the location 14 of the radio degradation.

The radio network node 12 may comprise a transmitting unit 606. The radio network node 12, the processing circuitry 601, and/or the transmitting unit 606 is configured to transmit a notification of the detected radio degradation to the at least one identified target wireless device 10. The notification may be adapted to be transmitted as a broadcast, a multicast or a unicast. The notification may be adapted to be transmitted if the location 14 of the radio degradation is not within the local residency. The transmitting may be adapted to be based on the level of radio degradation impact. The level of radio degradation impact may be based on at least one of: the number of measurements reported from the at least one reporting wireless device 11, the location of the at least one reporting wireless device 11 or the speed of the at least one reporting wireless device 11.

The radio network node 12 further comprises a memory 607. The memory 607 comprises one or more units to be used to store data on, such as radio degradation information, measurement reports, input/output data, metadata, etc. and applications to perform the methods disclosed herein when being executed, and similar. The radio network node 12 may further comprise a communication interface comprising e.g. one or more antenna or antenna elements.

The methods according to the embodiments described herein for the radio network node 12 are respectively implemented by means of e.g. a computer program product 608 or a computer program, comprising instructions, i.e., software code portions, which, when executed on at least one processor, cause the at least one processor to carry out the actions described herein, as performed by the radio network node 12. The computer program product 608 may be stored on a computer-readable storage medium 609, e.g. a disc, a universal serial bus (USB) stick or similar. The computer-readable storage medium 609, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium.

In some embodiments a more general term "network node" is used and it can correspond to any type of radio-network node or any network node, which communicates with a wireless device and/or with another network node. Examples of network nodes are gNodeB, eNodeB, NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any radio access technology (RAT) or multi-RAT systems, where the devices receives and/or transmit signals, e.g. data, such as New Radio (NR), W-Fi, Long Term Evolution (LTE), LTE-Advanced, Wideband Code Division Multiple Access (WCDMA), Global System for Mobile communications/ enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE or network node, for example.

Alternatively, several of the functional elements of the processing units discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Figure 7:
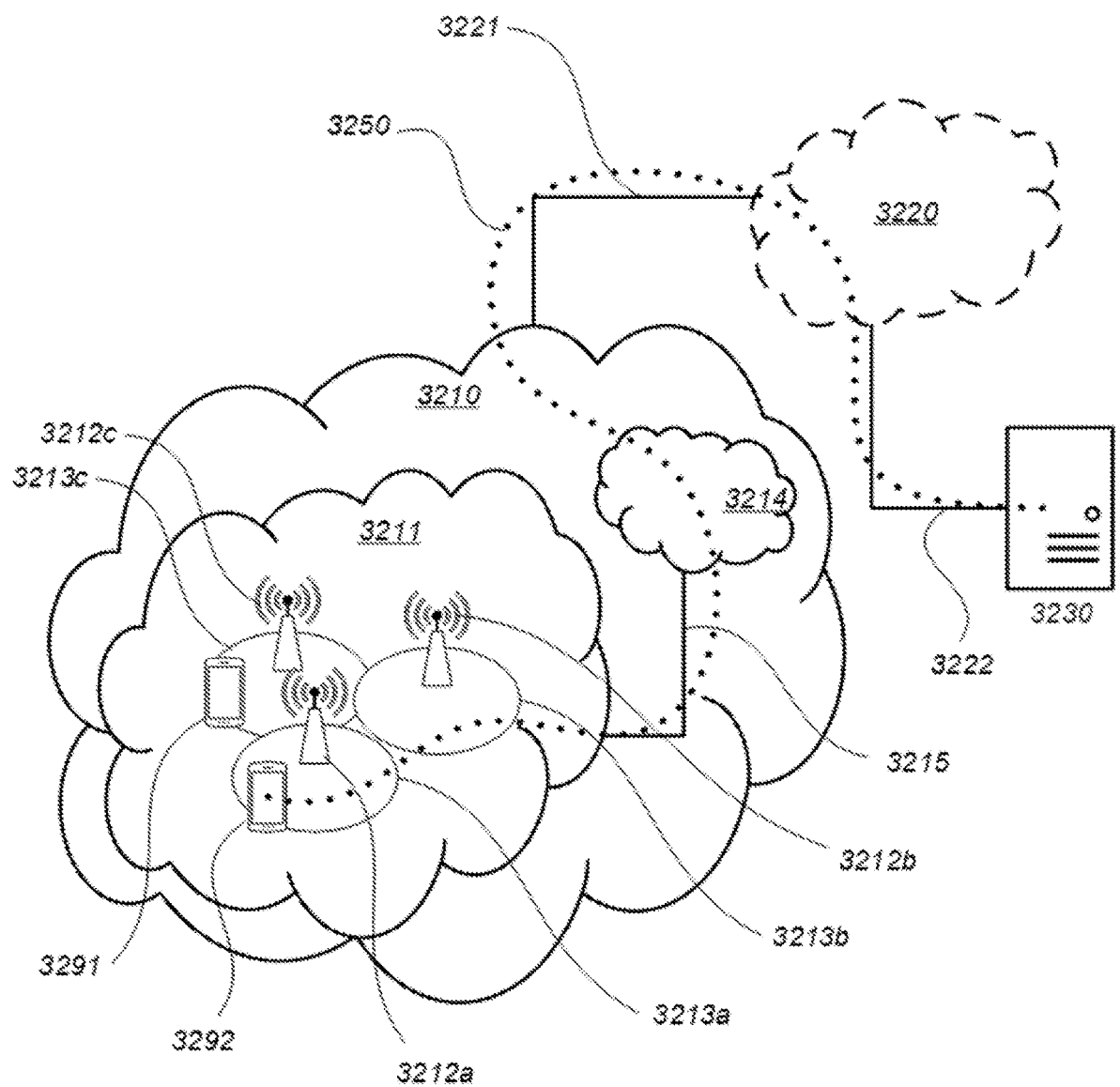
FIG. 7 illustrates a telecommunication network connected via an intermediate network to a host computer in accordance with some embodiments.

FIG. 7 shows a Telecommunication network connected via an intermediate network to a host computer in accordance with some embodiments. With reference to FIG. 7, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points being examples of the radio network node 12 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 7 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 8:
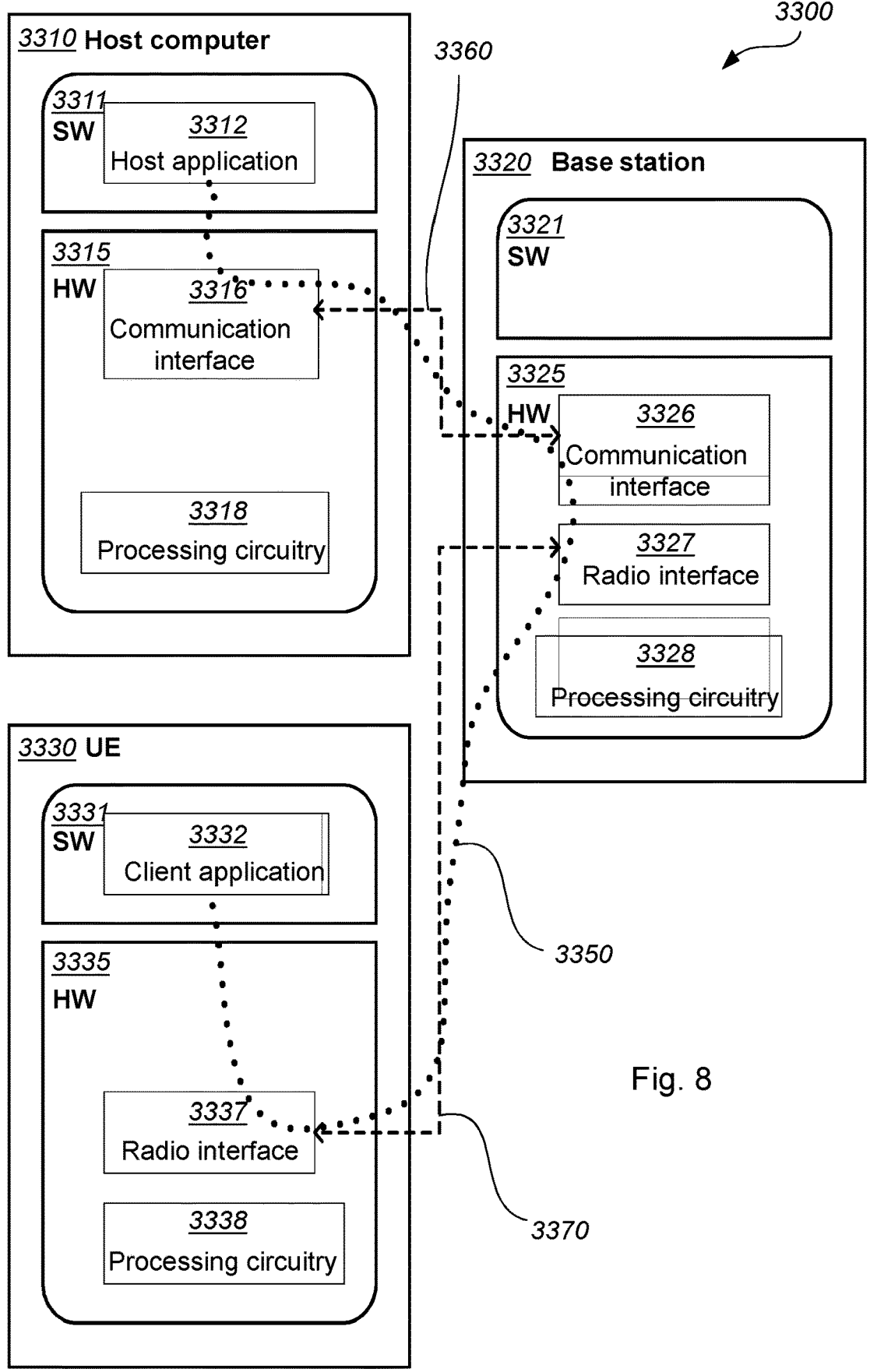
FIG. 8 illustrates a host computer communicating via a base station with a user equipment over a partially wireless connection in accordance with some embodiments.

FIG. 8 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 8. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 8) served by base station 3320. Communication interface 3326 may be configured to facilitate connection 3360 to host computer 3310. Connection 3360 may be direct or it may pass through a core network (not shown in FIG. 8) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 8 may be similar or identical to host computer 3230, one of base stations 3212a, 3212b, 3212c and one of UEs 3291, 3292 of FIG. 7, respectively. This is to say, the inner workings of these entities may be as shown in FIG. 8 and independently, the surrounding network topology may be that of FIG. 7.

In FIG. 8, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may increase the performance of the UE as only the affected wireless devices in the cell are informed about the radio degradation instead of informing all wireless devices in the cell. This improves the UE battery life time and the overall network signalling overhead.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

FIG. 9 shows methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 9 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 10 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figures 11, 12:
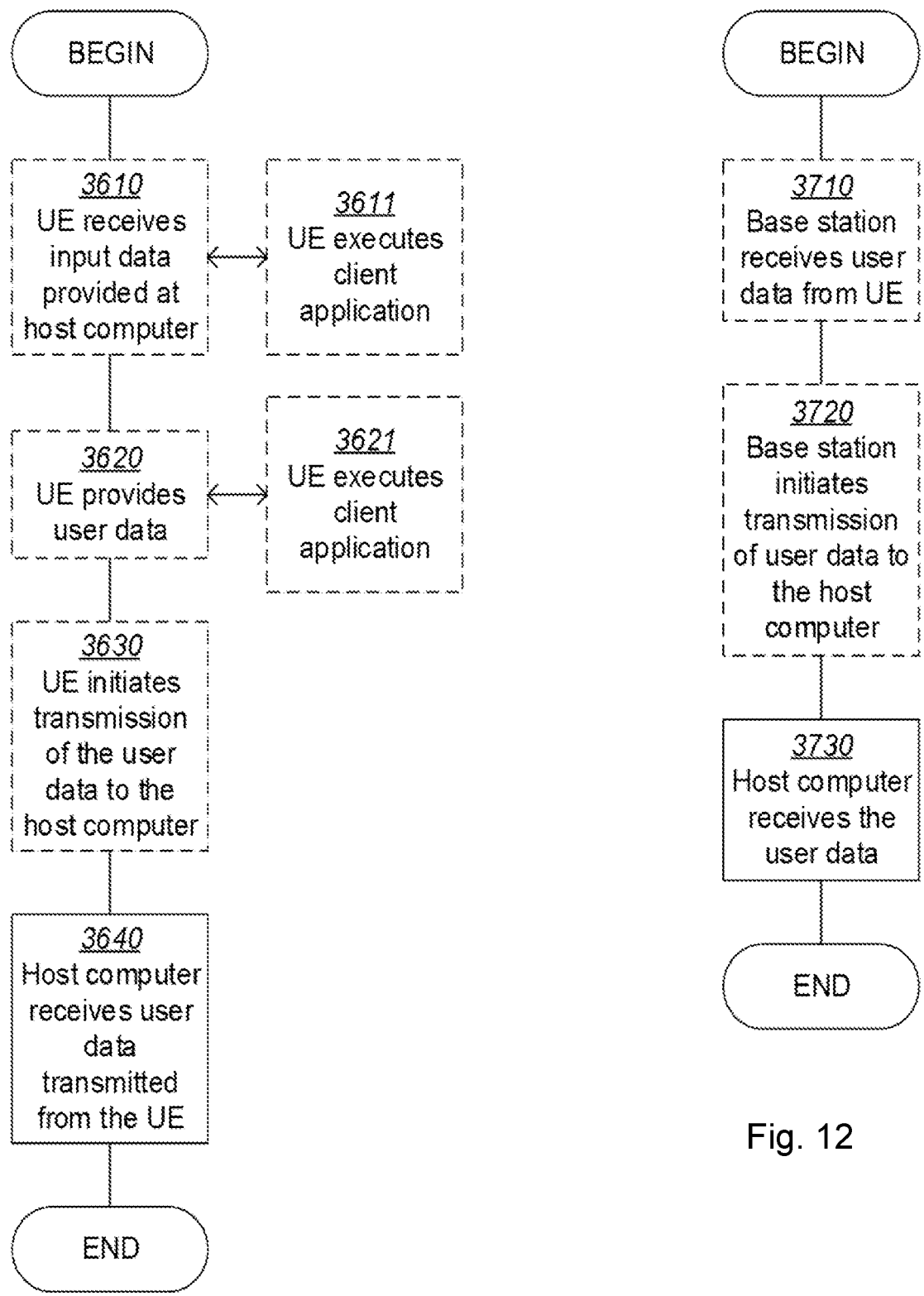
FIG. 11 illustrates methods implemented in a communication system including a host computer, a base station and a user equipment in accordance with some embodiments.
FIG. 12 illustrates methods implemented in a communication system including a host computer, a base station and a user equipment in accordance with some embodiments.

FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 11 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 12 show methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 12 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio network node for handling a radio degradation in a wireless communication network, wherein the method comprises:
    detecting the radio degradation in a radio coverage area served by the radio network node;
    determining whether a location of the radio degradation is within a local residency or not;
    identifying at least one target wireless device to inform about the radio degradation; and
    transmitting a notification of the detected radio degradation to the at least one identified target wireless device, wherein the notification indicates whether the location of the radio degradation is within the local residency or not.

2. The method according to claim 1, wherein the detecting is based on at least one measurement report received from at least one reporting wireless device present in the radio coverage area.

3. The method according to claim 2, wherein the at least one measurement report comprises radio related measurements that fulfil a predefined radio degradation condition.

4. The method according to claim 2, wherein the level of radio degradation impact is based on at least one of: the number of measurements reported from at least one reporting wireless device, the location of the at least one reporting wireless device or the speed of the at least one reporting wireless device.

5. The method according to claim 1, wherein the notification is transmitted as a broadcast, a multicast or a unicast.

6. The method according to claim 1, wherein the notification is transmitted if the location of the radio degradation is not within the local residency.

7. The method according to claim 1, wherein it is determined that the location of the radio degradation is within the local residency when at least one of the following conditions is verified:
    at least one reporting wireless device present in said radio coverage area is/are moving with a velocity which is below a threshold;
    the location of the radio degradation is within a local residency according to a geographic map;
    measurements reported from the at least one reporting wireless device are below a threshold within a time interval; or
    a reporting wireless device movement range is below a threshold.

8. The method according to claim 1, further comprising:
    if the location of the detected radio degradation is close to a border of a neighboring radio coverage area, initiating in the neighboring radio coverage area, a procedure of warning one or more target wireless devices in the neighboring radio coverage area, which are moving towards the radio coverage area served by said radio network node.

9. The method according to claim 1, wherein the identifying the at least one target wireless device further comprises determining if the at least one target wireless device is moving towards a location of the radio degradation.

10. The method according to claim 1, wherein the transmitting is based on a level of radio degradation impact.

11. A radio network node for handling a radio degradation in a wireless communication network, wherein the radio network node is configured to:
- detect the radio degradation in a radio coverage area served by the radio network node;
- determining whether a location of the radio degradation is within a local residency or not;
- identify at least one target wireless device to inform about the radio degradation; and
- transmit a notification of the detected radio degradation to the at least one identified target wireless device, wherein the notification indicates whether the location of the radio degradation is within the local residency or not.

12. The radio network node according to claim 11, wherein the detecting is based on at least one measurement report received from at least one reporting wireless device present in the radio coverage area.

13. The radio network node according to claim 12, wherein the at least one measurement report is adapted to comprise radio related measurements that fulfil a predefined radio degradation condition.

14. The radio network node according to claim 12, wherein the level of radio degradation impact is based on at least one of: the number of measurements reported from the at least one reporting wireless device, a location of the at least one reporting wireless device or the speed of the at least one reporting wireless device.

15. The radio network node according to claim 11, wherein the notification is adapted to be transmitted as a broadcast, a multicast or a unicast.

16. The radio network node according to claim 11, wherein the notification is adapted to be transmitted if the location of the radio degradation is not within the local residency.

17. The radio network node according to claim 11, wherein it is determined that the location of the radio degradation is within a local residency when at least one of the following conditions is verified:
- at least one reporting wireless device present in said radio coverage area is/are moving with a velocity which is below a threshold;
- the location of the radio degradation is within a local residency according to a geographic map;
- measurements reported from the at least one reporting wireless device are below a threshold within a time interval; or
- a reporting wireless device movement range is below a threshold.

18. The radio network node according to claim 11, wherein the radio network node is further configured to:
- if a location of the detected radio degradation is close to a border of a neighboring radio coverage area, initiate in the neighboring radio coverage area, a procedure of warning one or more target wireless devices in the neighboring radio coverage area, which are moving towards the radio coverage area served by said radio network node.

19. The radio network node according to claim 11, wherein the identifying the at least one target wireless device further comprises determining if the at least one target wireless device is moving towards a location of the radio degradation.

20. The radio network node according to claim 11, wherein the transmitting is adapted to be based on a level of radio degradation impact.

21. A computer program product comprising a non-transitory computer readable storage medium storing instructions, which, when executed on at least one processor, cause the at least one processor to carry out the method according to claim 1, as performed by the radio network node.

22. A non-transitory computer-readable storage medium, having stored thereon instructions which, when executed on at least one processor, cause the at least one processor to carry out the method according to claim 1, as performed by the radio network node.

* * * * *